Sept. 2, 1969  J. J. P. BERNARD  3,464,559

APPARATUS FOR THE BIOLOGICAL PURIFICATION OF WASTE WATER

Filed Feb. 21, 1968  2 Sheets-Sheet 1

INVENTOR
Jacques Joseph Paul Bernard

BY *Tourover and Browdy*

ATTORNEYS

INVENTOR

Jacques Joseph Paul Bernard

BY Tourover and Browdy

ATTORNEYS

United States Patent Office 3,464,559
Patented Sept. 2, 1969

3,464,559
APPARATUS FOR THE BIOLOGICAL PURIFICATION OF WASTE WATER
Jacques Joseph Paul Bernard, Port-Marly, France, assignor to Degremont S.A., Suresnes, Hauts-de-Seine, France, a corporation of France
Filed Feb. 21, 1968, Ser. No. 707,069
Claims priority, application France, Feb. 23, 1967, 96,150
Int. Cl. C02c 1/06
U.S. Cl. 210—195                                  10 Claims

ABSTRACT OF THE DISCLOSURE

An apparatus is provided for treatment of sewage by the activated sludge method. The decantation zone surrounds the aeration zone, and presents a double slope at its bottom, i.e., from the aeration zone, a bottom slope of a sufficient amount for the sludge to fall back into the aeration zone is first provided, to which is added a horizontal or substantially horizontal bottom, the change of slope being situated approximately at the height of the horizontal line at which is established the separation between the sludge bed and the pure liquid.

---

The techniques of applying the method for biological purification of city or industrial sewage by means of activated sludge have, in recent years, undergone numerous new developments. One of the goals most frequently sought in the improvements thus far made has been to maintain the aerobic purifying microorganisms fully active during the period of the process, so as to increase the weight of the impurities eliminated by a given bacterial mass during a given length of treatment time. As this goal is approached, at least partially, it becomes more possible to obtain a fixed efficiency of purification with a smaller bacterial mass, thereby resulting in a reduction in the purification time and hence in the volume of the treating chambers (basins), designated as aeration basins, with the attendant savings in the cost of constructing purification plants.

This maintenance of the bacterial flora at a constant level of activity, however, during the entire span of the process presents a major difficulty. A significant portion of the biological mass is, in fact, present in the decantation chamber where, after the aeration phase, the liquor of activated sludge is sent so that the interstitial purified water can be separated from the biological flocculate. In the bottom of these decantation basins are thus collected the slimy activated concentrates which are to be returned to the aeration basins in order to maintain in the latter a sufficient concentration of purifying microorganisms. This return by recirculation of the decanted sludge should take place as rapidly as possible, since its prolonged maintenance in the decantation basins, where no introduction of oxygen is possible, results in its transformation into a state of anaerobiosis, resulting in a very marked reduction in the bacterial activity and a rapid deterioration in the quality of the activated sludge.

Unless complex technological artifices are employed, the necessity of this rapid recovery of the decanted sludge results in a practical limitation on the size of the decantation chamber. If a rectangular decantation chamber is considered, for example, with reference to FIGS. 1 and 1a of the attached drawings, where the liquor of activated sludge arriving from the areating apparatus enters at A, and the treated water leaves at B, and where the decanted sludge is collected in a trough F by means of a motorized scraper R which moves the sludge deposited on the floor to the trough F, the speed of movement of this scraper R is limited to several centimeters per second, since, at higher speeds, turbulent parasite currents would be created which would disturb the separation of the purified water from the biological flocculate, such separation being the first and indispensable aim of the decantation operation. It follows that the length of the rectangular decantation chambers used in the biological purification of sewage is limited by the proper evolution of the purification itself.

In place of an intermittent system of scraping (a scraper entrained by a motorized back-and-forth bridge P), it is obviously possible to employ a nearly continuous system of scraping. Thus, closed chains equipped with small scrapers have also been used, which are entrained and guided by submerged cogged wheels. In this case, however, there are mechanical reasons (good performance and guiding of the chains) which limit the length of the decantation chambers. Also for mechanical reasons, the width of the decantation basins equipped with chain scrapers are limited and cannot exceed approximately ten meters.

In all these cases, the length of the decantation chambers used in biological purification cannot, in practice, exceed 50 meters.

It follows that for large installations a great number of decantation chambers must be provided, with the serious disadvantages resulting from this multiplicity with respect to the cost of construction and the reliability of operation.

Considerable progress has been made in ensuring, in a simple manner, this preservation of the aerobic phase of the entire bacterial mass present in the purification system by perfecting combined installations. In these installations, the aeration and decanting phases are performed within the same hydraulic enclosure.

FIG. 2 shows the vertical section of one of these prior known installations, a section which is identical over its entire length.

The raw water is introduced at 1 into a central aeration zone 2, at the base of which the air, needed to oxygenate the liquor of activated sludge and for oxygenation of the organic materials contained in the raw water, is blown, such as through the bottom 3 of the installation. The apparatus presents two lateral decantation zones 4, fed through openings 5 with the liquor of activated sludge. The purified water is discharged at 6. The decanted sludge is collected at the bottom of the zones 4, which are in direct communication with the central aeration zone through the continuous slots 7. The decanted sludge is thus recycled naturally, and the bottom part of the decantation zones is an oxygenated zone, due simply to the exchanges existing between the aeration zone 2 and the decantation zone 4 through the continuous apertures 7.

The time that the decanted sludge is held in the zones 4 can be extremely short (on the order of 15 minutes), since the flow of the liquor of activated sludge introduced through the orifices 5 can be very much higher than the flow of treated water leaving the apparatus at 6. As a consequence, a strong recycling current is formed through the apertures 7, which is added to the sole effect of the forces of gravity to return the decanted sludge to the aeration zone. The excess sludge resulting from elimination of the pollution is evacuated by means of pipes 8 disposed at various points over the length of the installation to the flow to be treated and the mass of pollution to be eliminated. It is possible to build installations of this type several hundred meters in length.

The proper operation of these combined installations, however, is subject to certain mandatory factors which must enter into the actual design of these installations, in terms of the following limitations:

Their depth is limited, since it is indispensable that provision be made for blowing in air through the base of the installation in order to be certain that whatever the recirculation flow rate and the rate of injected air, the decanted sludge is returned to the aeration zone, since an excessive depth of the installation would require the use of excessively high air pressures;

Their width is limited, since a sufficient slope (45° from the horizontal) in the walls of the decantation zones 4 must be maintained so that the decanted sludge, the concentration of which is only several grams of dry matter per liter, does not stick to these walls, thereby avoiding the risks of anaerobic fermentation of these deposits.

In order to obtain a purification installation ensuring agglomeration, combined installations have been designed, the length of which can be prohibitive and which, in any case, are very expensive.

The present invention provides improvements in combined installations for biological purification which, while retaining the essential qualities of a good combined installation, permit the obtaining of larger installations than the combined plants presently known, without increasing the number of inner walls or their linear dimensions. The consequence of this is the possibility of obtaining installations which are markedly more economical. The improvements according to the invention also make it possible to resolve simply the problem of removing excess sludge resulting from the purification process.

It has now been observed that:

(a) In a combined installation such as the one shown in FIG. 2, there is formed in the midst of the decantation zones 4 a bed of sludge in which the solid particles follow a constantly descending path; there is a delivery of sludge to the bottom section and there is an evacuation of the sludge through the continuous apertures 7. This bed of sludge is formed at an equilibrium level where the descending forces exerted on the particles caused by the recycling current and by their own weight compensate for the constant delivery of new materials coming from the orifices 5 and the ascending force caused by the ascent of the flow of treated water leaving the drain 6.

In a combined installation such as is shown in FIG. 2, where the slopes of the outer walls of the zones 4 are at an angle of 45° from the horizontal, this equilibrium level is reached approximately at mid-height for normal operation conditions.

In an installation 4 meters deep, the bed of sludge is thus found about 2 meters from the surface. The residual volume of sludge present in the top layer of water is extremely small.

(b) In a combined installation, because of the very high rate of recirculation of the decanted sludge maintained without any expenditure of energy other than that required for the oxygenation, the concentration of the decanted sludge is low. It does not exceed, on the average, 4 g./l.

According to the present invention and in conformity with one of its characteristics, the decantation zones situated on each side of the aeration zone present a bottom with a double slope, i.e., starting from the aeration zone, there is a first bottom portion inclined at a sufficient angle so as to permit the fall-back of the sludge into the aeration zone, which is followed by a second bottom portion which is horizontal or substantially horizontal, the change in slope between the bottom portions occurring approximately at the height of the level where the separation between the bed of sludge and the purified liquid takes place.

Preferably, and according to another characteristic of the invention, the surface of the horizontal portion of the bottom of the decantation zone considerably enlarges the width of the decantation zone, thereby providing an increase in the dimensions of the decantation zone, without a corresponding increase in the length of the installation and its inner walls.

These and other objects in the nature and advantages of the present invention will be more apparent from the following detailed description, taken in conjunction with the drawing wherein.

Figure 1:
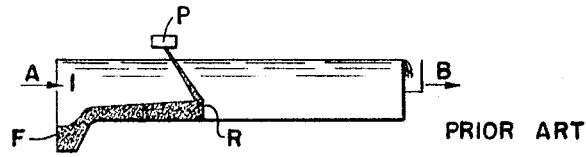
FIGS. 1, 1a and 2 show prior known installations.
Figure 1A:
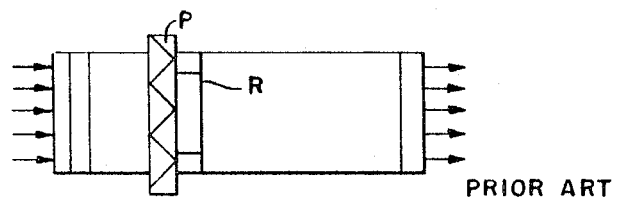
Figure 2:
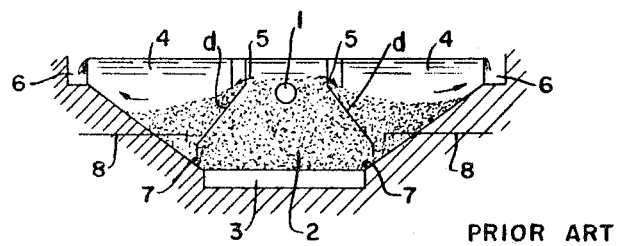

A combined installation in accordance with the present invention includes, as in the prior art device of FIG. 2, a decanting zone 16 having a sloped bottom 12, an aeration zone 10 centrally located with respect to the decanting zone(s), a raw water inlet 1, a purified water outlet 18, separating walls 20 and 22 having an upper passageway 5 and a lower passageway 7, and air injecting bottom 3.

According to the present invention, the base of the installation presents, on each side of the central aeration zone 10, two sections 12 and 14 of the decantation zone 16 each having a different slope. Section 12, the closest to the aeration zone 10, has a slope of about 45° from the horizontal. This section extends upwardly to about one-half of the height of the installation. Extending from section 12 is the second section 14, which is substantially horizontal and extends, over about one-half of the horizontal width of the decantation zone.

Figure 3:
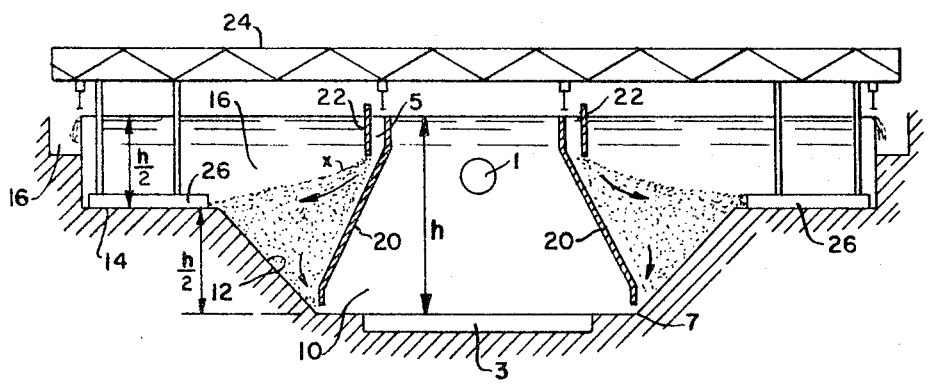
FIG. 3 is a vertical sectional view partly schematic, of one embodiment of the present invention.

In proximity to the height where the slope changes, the horizontal section 14 enlarges and, in the example of FIG. 3, approximately doubles the width of the decantation zone, resulting in a corresponding increase in the capacity of the decantation zones 16. From this height, the ascending speed of the flow of purified liquid leaving an outlet drain 18 is reduced very rapidly in a similar ratio.

It can be seen, therefore, that for a recirculation flow of the liquid to be treated in the FIG. 3 embodiment which is double that provided for an installation according to FIG. 2, the bed of sludge is formed at the same level. Since the extent of this recirculation flow, in terms of the purificaton process proper, is linearly associated with the flow of water to be treated and also with the mass of microorganisms present in the system, it is seen that a combined installation according to FIG. 3 makes it possible to double the volume of the aeration as compared to an installation according to FIG. 2, and without increasing the size of the separating partitions 20 and 22.

It is thus possible to construct combined installations of twice the volume and double the capacity without lengthening the inner partition walls 20 and 22. For large plants, the number of installations required for operation is divided by a factor of at least two, thus producing significant savings in terms of the civil engineering required.

If the bed of sludge is formed approximately along a line $x$, the volume of sludge which can be deposited on the horizontal portion of the decantation zones is very small (on the order of 10% of the total volume present in the decantation zone); it is not, however, zero. Over a long period, a deposit could be formed which would convert to an anaerobic condition, with the disadvantages that this represents for the purification process.

In order to avoid the formation of an excessive sludge deposit along portion 14, the installation is straddled by a motorized bridge 24 of light construction which rests on both the outer and inner walls of the installation and to which are fastened two small scrapers 26, the purpose of which is to prevent the deposition of matter on the portion 14 at the bottom of the decantation zone.

These two scrapers do not normally present any slope with respect to the plane and are normal to the longitudinal axis of the basin. In view of the low concentration, in fact, of the sludge deposited on the portion 14 of the base (a few grams per liter) and the very small angle of slide of the sludge, it is sufficient merely to displace the sludge in order for it to flow off toward the deep area of the decantation zone, where it will be picked up again by the internal circulating current.

Figure 4:
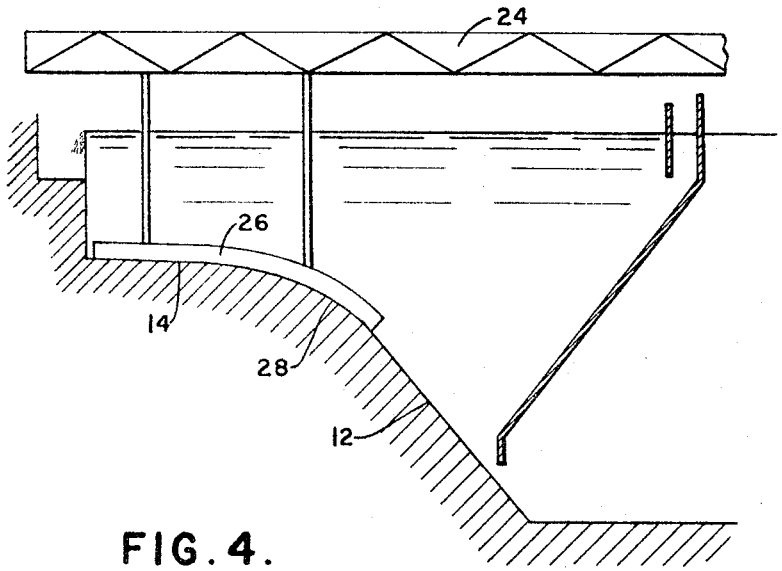
FIG. 4 is a detailed sectional view, partly schematic, of a second embodiment of the present invention.

For large plants, it is desirable to give the bottom of the lateral decantation zones 16 a continuous change in slope 28, as shown in FIG. 4. In this embodiment portion 14 is not absolutely horizontal but presents a slope of several degrees on the horizontal, preferably not more than about 10°, portion 12 displays a slope equal to or greater than 45° from the horizontal; and portion 28 is a curved connecting zone between portions 12 and 14.

The scrapers 26 extend over the portions 14 and 28, so as to ensure the passage of all the sludge into portion 12 with its steep slope.

In the installation of FIG. 4, the detrimental effect on the quality of the activated sludge, and hence on the purification process, of an excessively long installation will be very much less noticeable than in the longitudinal decanters used in systems where the aeration and decanting are performed in separate units. In fact, in the present case, the volume of sludge requiring mechanical scraping is, as is stated above, very much smaller and constitutes only a small portion of the total volume of sludge present in the purification system. It thereby becomes possible to build without difficulty installations which are several hundred meters long, a layout impossible to achieve with decantation units which are separate from the aeration units.

The speed of movement of the bridge 24 is comparable to that normally employed of 3 to 6 cm./sec. The scrapers 26 are immersed in about 2 meters of water, and this depth eliminates the risk of whirlpool lifting of the sludge to the surface as the scrapers pass through.

It should be noted that while the installation of FIG. 4 and the basic structure of FIG. 3 permit the simultaneous doubling, without the construction of additional walls, of the horizontal surfaces of the aeration and decanting zones of the combined installations compared with the one shown in FIG. 2, it is also possible to double only the horizontal decantation surface without increasing the size of the aerating units.

Figure 6:
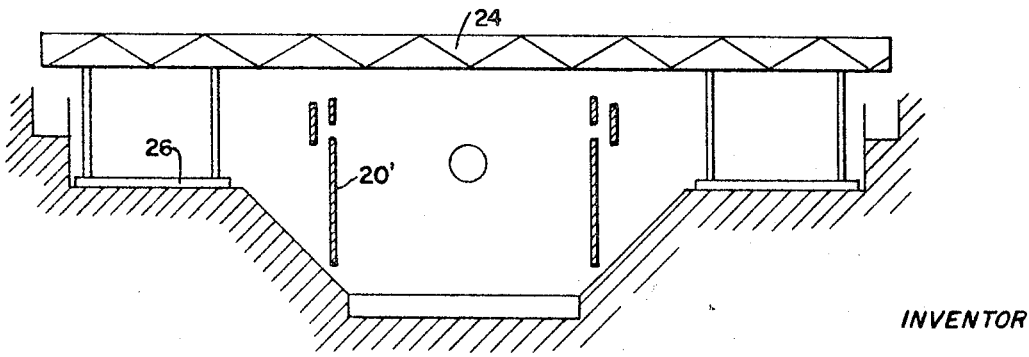
FIG. 6 is a vertical sectional view, partly schematic, of a fourth embodiment.

Moreover, whereas in the traditional combined installations the partitions (see FIG. 2) establishing the separation between the aeration and decantation zones present a profile or cross-section in the form of a curved line, so as not to confine within inacceptable limits the dimensions of the decantation zone, the present invention permits the use of straight vertical partitions 20' noting FIG. 6, thus resulting in additional savings in the cost of the civil engineering because of their simplicity of construction.

On the other hand, the present invention proposes also a very simple solution to the problem of evacuating the excess sludge formed by the synthesis of the organic materials eliminated from the water. In traditional combined installations, such as the one shown in FIG. 2, the excess sludge is evacuated by pipes 8 connected to drain tanks under load beneath the water level and which are connected by gutters exterior to the installation. This arrangement is most often costly, particularly in the case of buried installations.

Figure 5:
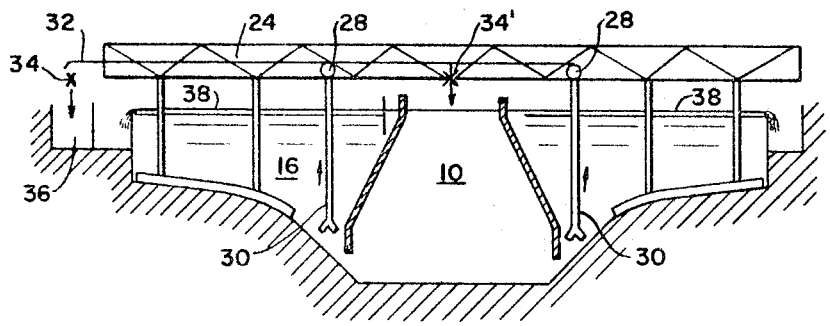
FIG. 5 is a vertical sectional view, partly schematic, of a third embodiment similar to the second embodiment of FIG. 4.

To avoid this, according to the present invention, two electric pumps 28 are installed on the bridge 24 (see FIG. 5), the electric power feed of which is combined with that of the bridge. These pumps are equipped with suction lines 30 opening into the bottom portion of the decantation zones 16. These deliver through an evacuation pipe 32, i.e. a pipe capable of discharging the pumped sludge either through the valve 34 into an evacuation spout 36 located on ground level, or through the valve 34' into the aeration zone 10.

In order to ensure maximum removal of the excess sludge, the valve 34 is opened and the valve 34' is closed. To regulate this discharge flow of sludge to the lower value, the valve 34 is partially opened, or the valves 34 and 34' can be of the automatic type and controlled by an adjustable mechanism. The evacuation spout for the excess sludge 36 can be situated above one of the two longitudinal spouts for the discharge of treated water. If this spout 36, however, is situated at a lower point than the water level, the pumps 28 for the suction of excess sludge can be replaced by simple siphoning pipes.

Additionally, a surface scraper 38 can also be attached to the bridge 24, the sole purpose of which is to detach from the walls the algae which might tend to form as a result of the high oxygen content of the water in installations of this type.

What is claimed is:

1. In a device for the purfication of waste and sewage waters using the activated sludge process comprising a decanting zone having a sloped bottom, an aeration zone located centrally with respect to said decanting zone, means to introduce water to be purified into the central upper portion of said aeration zone, means to withdraw purified water from the upper portion of said decanting zone, wall means separating said aeration zone from said decanting zone and including an upper passageway for the flow of liquid from said aeration zone to said decantation zone and a lower passageway for the flow of sludge from said decantation zone to said aeration zone, and means for introducing air into said aeration zone being located in the lower portion of said aeration zone, the improvement wherein the bottom of said decanting zone is provided with a sloped portion extending upwardly and outwardly from said separating wall means at an angle sufficiently great to enhance the downward flow of sludge to said lower passageway, the upward extent of said sloped bottom portion terminating at approximately the mid-height of said decanting zone, and the bottom of said decanting zone being further provided with a portion extending outwardly and generally horizontally an additional distance of the same magnitude as the horizontal distance of said sloped bottom.

2. A device in accordance with claim 1 wherein the angle of inclination of said sloped bottom is about 45°.

3. A device in accordance with claim 1 wherein a curved portion is provided along the bottom wall of said decanting zone between said sloped portion and said generally horizontally extending portion.

4. A device in accordance with claim 1 wherein said generally horizontally extending portion of said bottom of said decanting zone is inclined upwardly at an angle of less than about 10°.

5. A device in accordance with claim 1 further comprising means for scraping sludge from the bottom of said generally horizontally extending bottom of said decanting zone toward the sloping portion thereof at a low rate.

6. A device in accordance with claim 5 further comprising means to scrape algae from the walls of said device.

7. A device in accordance with claim 1 further comprising means extending downwardly through said decanting zone for the evacuation of excess sludge from near the bottom thereof.

8. A device in accordance with claim 7 comprising plural sludge exit means from said evacuating means and including valves for controlling the flow of sludge from said sludge exit means, one said exit means emptying into said aeration zone.

9. A device in accordance with claim 1 further comprising means to siphon excess sludge from said decanting zone.

10. A device in accordance with claim 1 wherein said separating wall is straight and is vertically disposed in said device.

References Cited

UNITED STATES PATENTS

| | | | |
|---|---|---|---|
| 2,678,916 | 5/1954 | Kalinske | 210—221 X |
| 3,339,741 | 9/1967 | Bernard et al. | 210—220 X |

JAMES L. DECESARE, Primary Examiner

U.S. Cl. X.R.

210—207, 220, 527